United States Patent
Ouellette

[19]

[11] Patent Number: 6,139,254
[45] Date of Patent: Oct. 31, 2000

[54] PALLET UNSTACKER/STACKER

[75] Inventor: Joseph F. Ouellette, Glendale, Mo.

[73] Assignee: Ouellette Machinery Systems, Inc., Fenton, Mo.

[21] Appl. No.: 09/075,643

[22] Filed: May 11, 1998

[51] Int. Cl.⁷ .................................................. B65G 59/06
[52] U.S. Cl. ................................... 414/797.4; 414/797.5; 198/345.1
[58] Field of Search ............................... 414/927, 797.5, 414/796.4, 929, 797.4; 198/345.1, 456

[56] References Cited

U.S. PATENT DOCUMENTS

| | | | |
|---|---|---|---|
| 2,858,043 | 10/1958 | Fenton et al. | 414/927 |
| 2,894,262 | 7/1959 | Schafroth | 198/345.1 |
| 3,069,050 | 12/1962 | Brettrager | 414/797.5 |
| 3,102,627 | 9/1963 | Acton et al. | 198/345.1 |
| 3,269,568 | 8/1966 | Kemp, Jr. | 414/797.5 |
| 3,757,971 | 9/1973 | Frish, Jr. | 414/797.9 |
| 4,557,656 | 12/1985 | Ouellette . | |
| 4,624,616 | 11/1986 | Freese . | |
| 4,743,154 | 5/1988 | James et al. . | |
| 5,096,369 | 3/1992 | Ouellette | 414/788.7 |

FOREIGN PATENT DOCUMENTS 2056681  8/1979  United Kingdom .

OTHER PUBLICATIONS

Emmeti S.p.A. *Automatic Palletizing Systems.*

Primary Examiner—Gregory A. Morse
Attorney, Agent, or Firm—Howell & Haferkamp, LC

[57] ABSTRACT

A pallet unstacker/stacker can receive a stack of skewed or misaligned pallets on a conveyor of the unstacker/stacker, raise all but the bottom most pallet in the stack, square or straighten the bottom pallet and then dispense the straightened pallet from the unstacker/stacker, lower the remaining stack of pallets onto the conveyor and again raise all but the bottom most pallet in the stack to repeat the straightening step and dispensing step of operation of the unstacker/stacker. All of the component parts of the unstacker/stacker are supported on a unitary, transportable frame that enables the pallet unstacker/stacker to be shipped in conventional cargo containers and also enables the pallet unstacker/stacker to be easily incorporated into existing pallet conveyor systems.

21 Claims, 10 Drawing Sheets

PALLET UNSTACKER/STACKER

BACKGROUND OF THE INVENTION (1) Field of the Invention

The present invention pertains to a pallet unstacker/stacker that can receive a stack of skewed or misaligned pallets on a conveyor of the dispenser, raise all but the bottom most pallet in the stack, square or straighten the bottom pallet and then dispense the straightened pallet from the dispenser, lower the remaining stack of pallets onto the conveyor and again raise all but the bottom most pallet in the stack to repeat the straightening step and dispensing step of operation of the dispenser. The operation of the device could also be reversed to stack pallets received by the device from a separate conveyor. All of the component parts of the stacker/unstacker are supported on a unitary, transportable frame that enables the pallet unstacker/stacker to be shipped in conventional cargo containers and also enables the pallet unstacker/stacker to be easily incorporated into existing pallet conveyor systems.

(2) Description of the Related Art

There are many different known types of pallet constructions that are employed in supporting goods when being shipped. The pallets are designed to be lifted by conventional forklift trucks and provide a base for large goods or for large numbers of goods that could not be manually lifted and transported. By supporting large, heavy goods or large numbers of goods on a pallet, the goods can be easily transported, for example, from a loading dock to a truck bed or vice versa, by a conventional forklift truck.

Most conventional pallets are constructed of wood and/or plastic and are intended to be reused several times. Returned pallets are usually stacked upon each other until they are needed. Often the stacking of the used pallets is done manually, resulting in skewing or misalignment of the pallets in many instances. What is meant by skewing or misalignment is that the sides of the pallets in the stack are not aligned and adjacent pallets are staggered or slightly turned relative to each other.

The skewing or misalignment of stacked pallets presents a problem to many known pallet dispensing apparatus. The typical prior art pallet dispensing apparatus is designed to receive a stack of pallets where the skewing or misalignment is minimal. If pallets stacked on each other are skewed to the extent that a corner of a misaligned pallet will project outwardly a small distance, for example approximately one to three inches, from the sides of the pallet stack the misalignment may prevent the stack from being loaded into the dispensing apparatus. When this occurs, the stack of pallets must be manually restacked so that the skewing of adjacent pallets is not so severe and so the restacked pallets may be loaded into the pallet dispensing apparatus.

Many known pallet dispensing apparatus are provided with templates that are employed to determine if the skewing of the stacked pallets is too severe to prevent them from being loaded into the dispensing apparatus. For example, if a stack of pallets cannot be passed through the template by a forklift without engaging the opposite sides of the template, then the skewing of the stack is too severe and the stack must be manually restacked to eliminate the skewing.

Many known pallet unstackers employ a pair of opposed arms that extend along opposite sides of a pallet stack supported by a conveyor and lift all but the bottom most pallet which is then moved on or dispensed by the conveyor. These prior art pallet dispensers do not include a mechanism for straightening the bottom pallet of the stack that is placed onto the conveyor. Therefore, care must be taken to ensure that the bottom pallet of the stack is placed on the conveyor in a sufficiently straightened orientation that will enable it to pass through the dispenser as the remaining pallets are unstacked and also to pass through the remainder of the pallet conveyor. If pallets in a stack are skewed or staggered, because the prior art dispenser or unstacker does not have a mechanism for straightening the pallets, it may be necessary to manually unstack and restack the pallets eliminating the skewed or staggered pallets in the stack. This results in lost time in unstacking pallets on the conveyor system and in increased costs for the labor involved in the manual unstacking and restacking of the pallets.

The disadvantages of prior art pallet straighteners can be overcome by a pallet unstacker/stacker that can easily be adjusted to straighten and dispense stacks of pallets of different sizes and which will still operate properly even if the stack of pallets loaded into the pallet unstacker/stacker are misaligned.

SUMMARY OF THE INVENTION

The present invention pertains to a pallet unstacker/stacker that can receive a stack of skewed or misaligned pallets on a conveyor of the dispenser, raise all but the bottom most pallet in the stack, square or straighten the bottom pallet and then dispense the straightened pallet from the dispenser, lower the remaining stack of pallets onto the conveyor and again raise all but the bottom most pallet in the stack to repeat the straightening step and dispensing step of operation of the dispenser. The device could also be operated in reverse to stack pallets received by the device from a separate conveyor in a straight stack. All of the component parts of the unstacker/stacker are supported on a unitary, transportable frame that enables the pallet unstacker/stacker to be shipped in a conventional cargo container and also enables the pallet unstacker/stacker to be easily incorporated into existing pallet conveyor systems.

The basic component parts of the pallet unstacker/stacker include a conveyor, a pair of lifting arms, and a pair of straightening guides. All of these component parts and their drive systems and a control system that controls the systematic operation of the drive systems are supported on a unitary, transportable frame. The transportability of the frame enables the pallet unstacker/stacker to be shipped in conventional cargo containers and also enables the pallet unstacker/stacker to be easily incorporated into existing pallet conveying systems.

The conveyor is a roller conveyor comprised of a plurality of rollers that extend laterally across the bottom of the dispenser frame. The rollers are driven by a conventional chain drive and an electric motor that drives the chain drive. The control system of the dispenser can operate the electric motor to move a pallet supported on the roller conveyor longitudinally forward toward an exit end or rearward toward an entry end of the dispenser. This enables the pallet unstacker/stacker to adjustably position an individual pallet or a stack of pallets forwardly or rearwardly on the conveyor. Photo sensors at the longitudinally opposite ends of the conveyor monitor the positions of the pallets supported on the conveyor. Toward the exit end of the conveyor, a plurality of photo emitters and an equal number of photo receptors are positioned on laterally opposite sides of the conveyor. Each of the photo emitters is associated with each of the photo receptors and each photo emitter emits light of a different frequency that is recognized only by its corresponding photo receptor. This enables the control system of the pallet unstacker/stacker to accurately determine the forward or leading edge of the second pallet of a stack of pallets supported on the conveyor. The system determines the position of the second pallet from the bottom of the stack because this is the pallet to be picked up by the lifting arms. The position of the bottom pallet is not important in the operation of the lifting arms. The sensed position of the second pallet is used by the control system of the pallet unstacker/stacker to adjustably position the stack of pallets supported on the conveyor longitudinally so that lifting tabs on the pair of lifting arms will be inserted into openings at the sides of the pallet to be lifted by the lifting arms.

The pair of lifting arms are supported at the back of the dispenser frame and project in a cantilever manner outwardly over the conveyor traversing the plurality of rollers. Each of the lifting arms has lifting tabs that project laterally toward the center of the dispenser. The pair of lifting arms are moved vertically up and down by a chain drive system powered by an electric motor. The pair of arms are moved laterally toward and away from each other by a pair of double acting, pneumatic piston/cylinder assemblies. The lifting arms are also provided with manually adjusted stops that determine the extent to which the lifting arms can be laterally separated from each other.

The guides are supported by the bottom of the frame and are positioned over the pluralities of rollers. The guides are comprised of a pair of rails that extend longitudinally over the rollers. Posts project downwardly from each of the guide rails between adjacent rollers to the drive mechanism for the rails positioned below the rollers. The drive for the guide rails is provided by a pair of double acting, pneumatic piston/cylinder assemblies that move the guide rails laterally toward and away from each other. The guide rails are also provided with adjustable stops that limit the lateral extent to which the guide rails can be separated from each other. The control system of the dispenser also systematically controls the supply of pneumatic pressure to the guide rail piston/cylinder assemblies to move the guide rails laterally toward each other and to move the guide rails laterally away from each other.

In operation of the pallet unstacker/stacker, a stack of pallets transported by a lift truck is passed through an entry opening of the dispenser frame and positioned on the conveyor. With the stack of pallets on the conveyor, the photo sensors determine the position of the pallet stack and the control system controls the drive of the conveyor to longitudinally adjust the position of the pallet stack forwardly or rearwardly to its desired position relative to the lifting arms and guide rails of the dispenser.

Next, the control system controls the lifting arms to move vertically and positions the lifting arms on opposite lateral sides of the second pallet resting on the first, bottom most pallet of the stack. The lifting arms are then controlled to move laterally toward each other, causing the tabs of the lifting arms to be inserted into openings in the sides of the pallet. As the lifting arms come together they contact the opposite sides of the pallet. If the second pallet is skewed, the lifting arms will straighten the sides of the pallet relative to the arms as they come together on the opposite sides of the pallet. The arms will not push the second pallet from side to side any more than is necessary to straighten the pallet. The lifting arms are raised vertically, lifting the stack of pallets from the second from the bottom pallet upwardly above the bottom most pallet supported on the conveyor.

The guide rails are then operated by the control system causing the drive system of the guide rails to move the guide rails laterally toward each other. The extent to which the guide rails move toward each other is determined by the adjustment of the stops for the guide rails. With the adjustment set, the guide rails will move toward each other engaging the opposite lateral sides of the bottom most pallet and thereby straightening or squaring the pallet on the conveyor. With the pallet squared, its longitudinally opposite edges are parallel with the laterally extending rollers of the conveyor. The guide rails do not move laterally toward each other to the extent where they would squeeze the bottom most pallet between them. The manual adjustment leaves ¾ of an inch clearance total between the opposite lateral sides of the pallet and the guide rails. The control system then controls the operation of the conveyor drive system dispensing the straightened pallet from the conveyor.

Next, the control system controls the guide rails to move laterally away from each other and controls the lifting arms to move vertically downwardly depositing the stack of pallets back on the conveyor. The operation of the dispenser is then repeated causing the lifting arms to again lift all but the bottom most pallet from the stack and controlling the guide rails in straightening the bottom most pallet before it is dispensed by the conveyor from the pallet unstacker/stacker.

If the device is to be used to stack pallets it is merely operated in reverse. A first pallet of the stack is conveyed into the device and supported on the conveyor rollers. The guide rails come together and straighten the first pallet. The lifting arms then come together and lift the first pallet from the conveyor rollers. The guide rails then separate and the conveyor is ready to receive the second pallet of the stack and the series of steps are repeated.

BRIEF DESCRIPTION OF THE DRAWINGS

Further objects and features of the present invention will be revealed in the following detailed description of the preferred embodiment of the invention and in the drawing figures, wherein.

DETAILED DESCRIPTION OF THE PREFERRED EMBODIMENT

Figure 1:
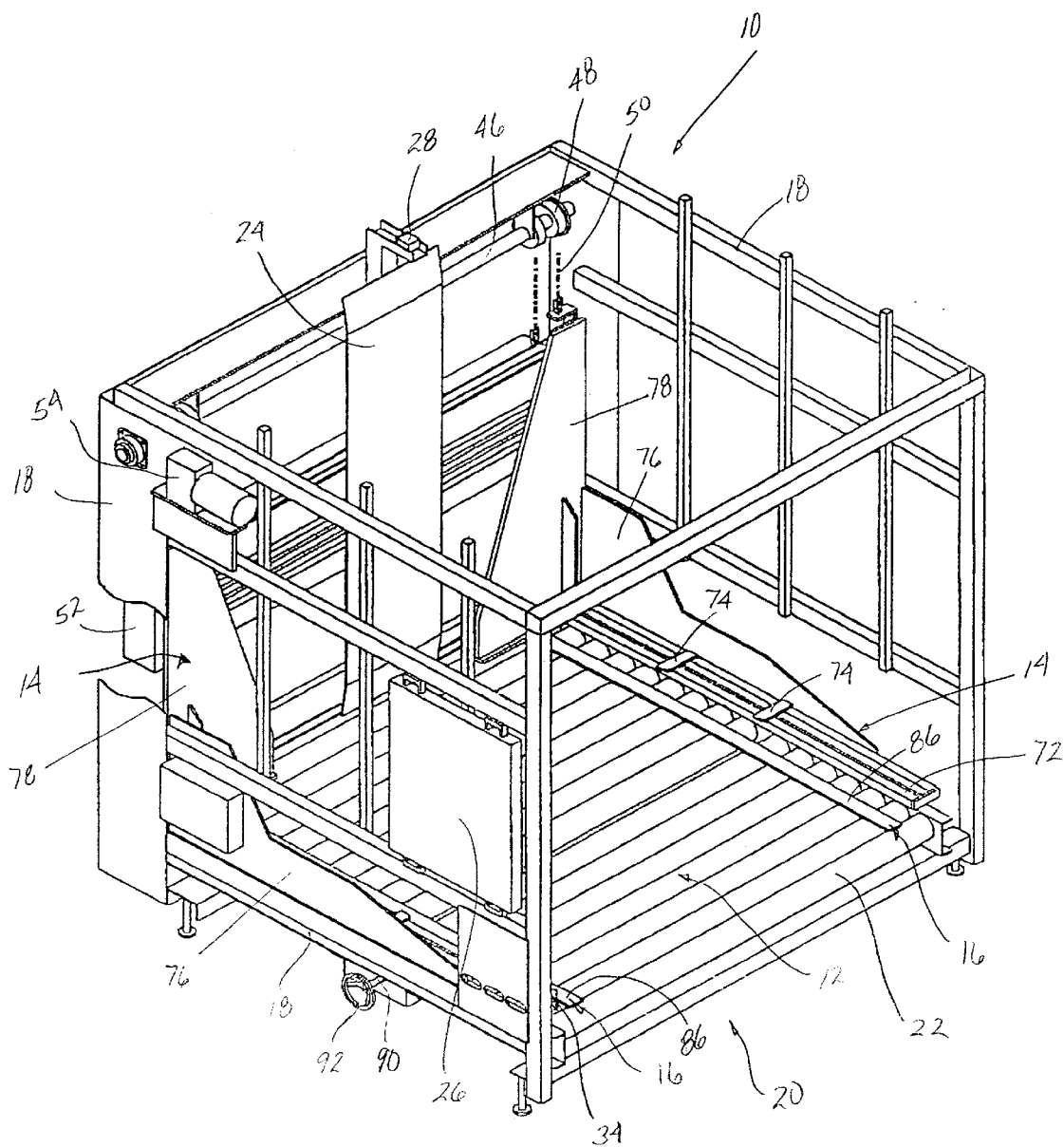
FIG. 1 is a perspective view of the pallet unstacker/stacker of the present invention with portions of the frame removed to provide a better view of the component parts of the device.

FIG. 1 shows the pallet unstacker/stacker 10 of the present invention. The pallet unstacker/stacker 10 is basically comprised of a conveyor 12, a pair of lifting arms 14, and a pair of guides 16 that are supported on a unitary, transportable frame 18. The frame 18 has a boxlike configuration constructed of conventional metal channel members such as box channels and C-shaped channels. The frame is constructed with a large entry opening 20 at its front that provides ample access for a stack of skewed or misaligned pallets through the entry opening. By skewed or misaligned what is meant is that the pallets in the stack are rotated relative to each other and their outer edges are not aligned or the pallets are staggered relative to each other. One of the primary benefits provided by the pallet unstacker/stacker is that it can receive pallets in a stack that are skewed to the extent that corners or sides of a pallet may extend as much as five inches from the corner or side of the adjacent pallet above or below it in the stack and the pallet unstacker/stacker of the invention will still be able to straighten or square the orientation of each pallet in the stack and dispense the straightened pallet from the dispenser. By squared or straightened, what is meant is that the pallet unstacker/stacker will orient the pallet to be dispensed relative to the lateral sides and longitudinally opposite front and back planes of the pallet unstacker/stacker before the pallet is dispensed. The dispenser includes several drive systems that are powered by either electric motors or air pressure supplied from an external source. Several of the electrical conductors and air lines of the dispenser are not shown to simplify the drawings.

A conveyor comprised of a plurality of rollers 22 is supported at the bottom of the frame 18. Each of the rollers 22 extend laterally across the dispenser frame and define a lateral width of the conveyor. The plurality of rollers 22 are arranged side-by-side and define a longitudinal length of the conveyor. The construction of the roller conveyor is similar to that of conventional roller conveyors. Each of the rollers 22 is driven by a chain drive at one end of the rollers so that all of the rollers 22 rotate in the same direction and at the same time. The chain drive system of the rollers 22 is powered by an electric motor (not shown). The systematic operation of the motor is controlled by a central control system 26 that is programmable. Use of such control systems to control the operation of conveyors is known in the art. Two of the rollers 122 are smaller, idler rollers that provide an area beneath them to accommodate the drive system for the guides, as will be explained.

The control system 26 operates responsive to information received from several sensors positioned on the frame 18. One photo sensor 28 is supported over the frame in a position toward the rearward end or discharge end of the dispenser. This photo sensor 28 is directed downwardly toward an associated reflector (not shown) and senses when a stack of pallets is positioned in the dispenser and on the conveyor rollers 22. When a stack of pallets is placed on the conveyor and any one of the pallets at the forward end of the stack interrupts the light of the photo sensor 28, the interruption of light sensor 28 tells the central control system that the stack of pallets is in position on the conveyor to begin the unstacking operation.

Figure 2:
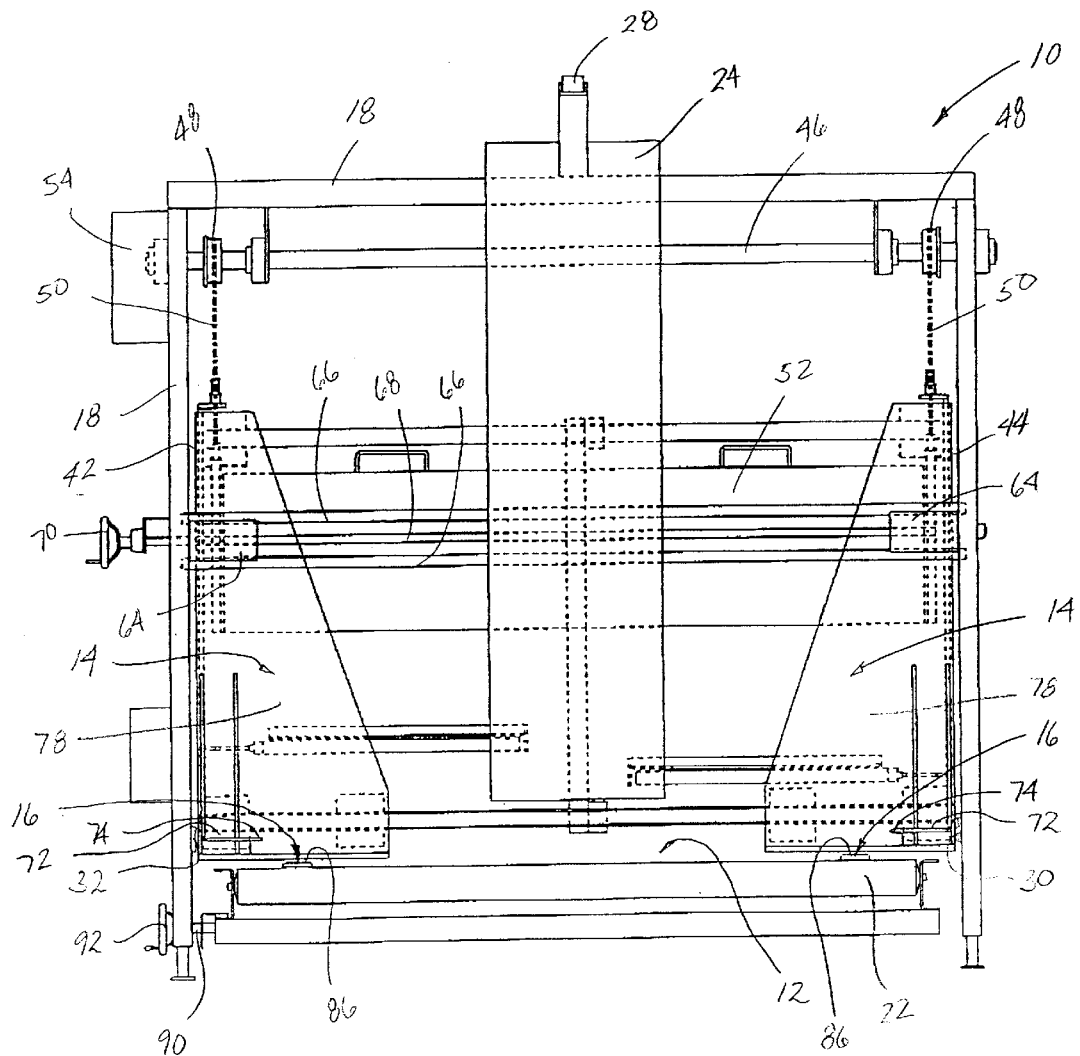
FIG. 2 is a front elevation view of the pallet unstacker/stacker.
Figure 3:
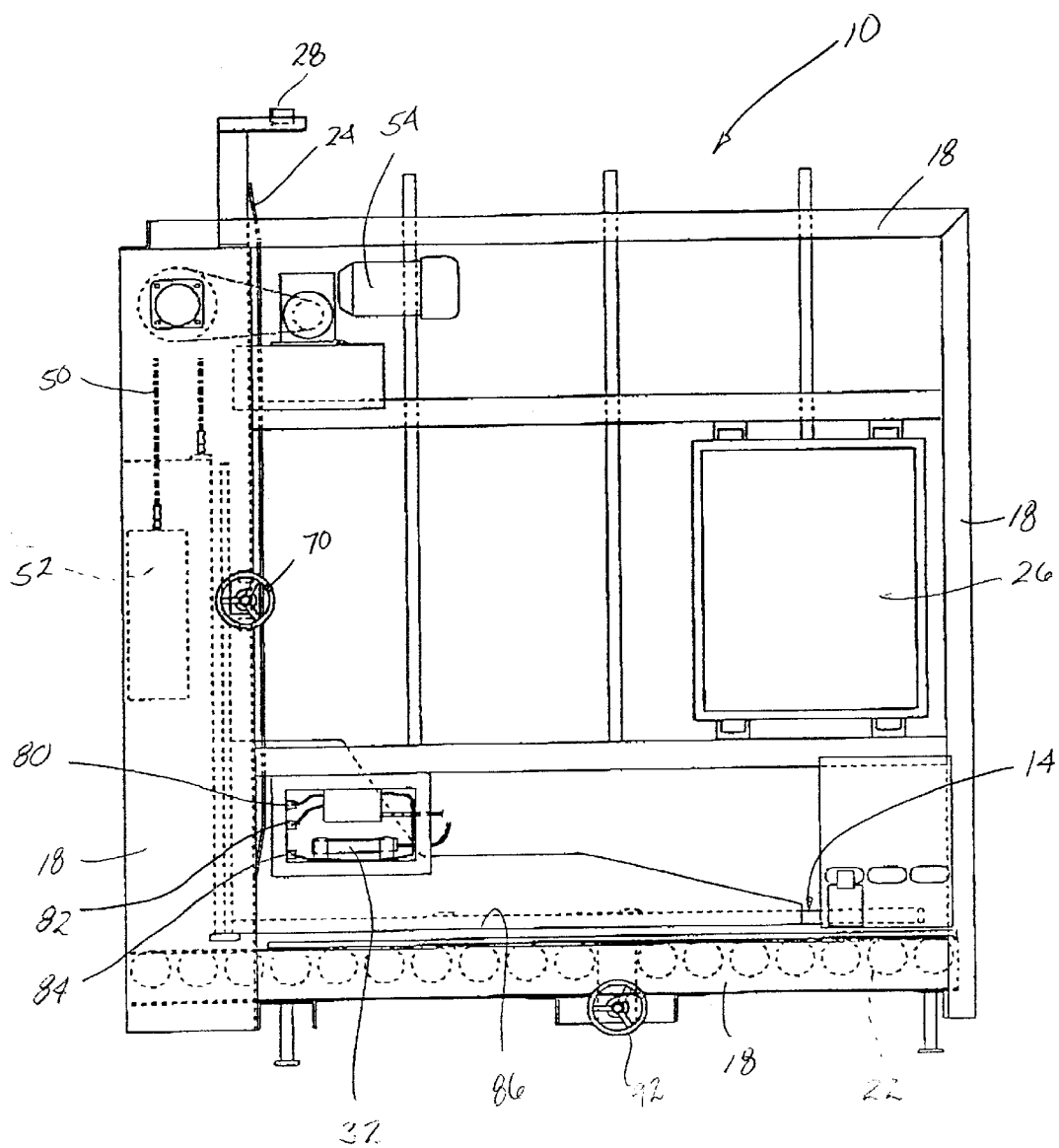
FIG. 3 is a left-hand side view of the pallet unstacker/stacker.

Referring to FIGS. 2 and 3, a linear array of photo emitters 30 are positioned on the right-hand side of the frame and a corresponding linear array of photo receptors 32 are positioned on the left-hand side of the frame. In the preferred embodiment, twelve emitters and receptors are used. Each of the photo emitters 30 emits a beam of light of a particular frequency that is recognized by only one of the corresponding array of photo receptors 32.

The control system and sensors determine the position of the second pallet from the bottom of the stack because this is the pallet to be picked up by the lifting arms. The position of the bottom pallet in the stack is not important in the operation of the lifting arms. The photo emitters 30 and photo receptors 32 are employed in determining the position of a second pallet in a stack of pallets placed on the conveyor when the stack of pallets is positioned on the conveyor with its runners positioned facing the photo emitters 30 and the photo receptors 32. For example, looking at the pallet shown in FIG. 10A, this pallet is constructed of three runners with boards extending across the tops and bottoms of the runners. The left-hand side of the pallet shown has a pair of notches in a runner. The right-hand side of the pallet shown has two large openings between the outer runners at the opposite sides of the pallet and a center runner. This side of the pallet with the large openings and the three ends of the runners exposed is the side being referred to here. When a stack of pallets is placed on the conveyor with the forks of a forklift passing through the notches in the runners, the ends of the runners shown on the right side of the pallet in FIG. 10A will be facing the photo emitters 30 and the photo receptors 32. With this stack of pallets positioned forward on the conveyor so that they are sensed by the photo sensor 28 that is directed downwardly from the top of the conveyor, the plurality of photo emitters 30 and photo receptors 32 are positioned in the plane of the second pallet in the stack. If any of the runners of the second pallet interrupt the light beam between any one of the photo emitters 30 and photo receptors 32, then the central control system 26 determines that the stack of pallets is properly positioned on the conveyor for operation of the lifting arms where tabs of the lifting arms will be received in the wide openings between the runners at the sides of the second pallet. Because the spacings between the ends of the runners on the right side of the pallet shown in FIG. 10A are large, the positioning of the stack of pallets on the conveyor is not as critical and the tabs on the lifting arms will still be able to be inserted into the spacings between the runners of the second pallet when lifting the second pallet from the first pallet on the conveyor.

If the top sensor 28 senses pallets on the conveyor but the light emitted by any of the photo emitters 30 and received by the photo receptors 32 is not interrupted by the second pallet in the stack, then a determination is made by the central control system 26 that the pallet stack is not far enough forward on the conveyor to align the lifting arm tabs with the openings between the pallet runners. The control system then causes the conveyor to move the pallet stack further forward until the runners of the second pallet interrupt a light beam between the emitters 30 and receptors 32. The pallet stack can be moved forward to the extent that it contacts the back plate 24. If contact with the back plate 24 is made by the pallet stack and the runners of the second pallet still do not interrupt light emitted by any one of the photo emitters and received by the photo receptors, then the central control system determines that a default condition exists. This would occur when the pallets in the stack are so staggered that the second pallet in the stack is spaced from the leading edge of the forward most pallet in the stack by twelve or more inches. On such a condition, the pallet stack must be restacked.

Figure 10:
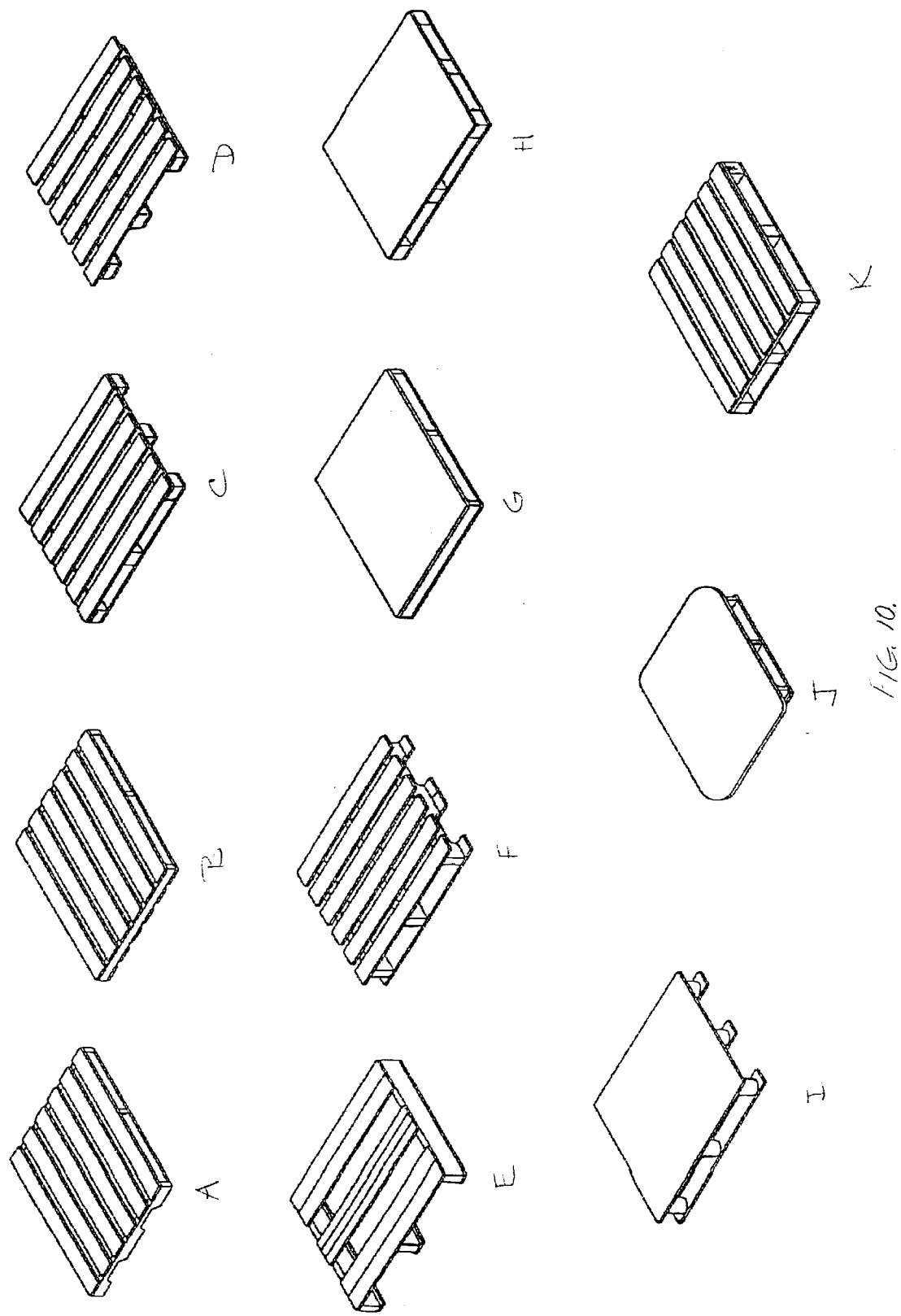
FIG. 10 illustrates various different types of pallets that may be used with the pallet unstacker/stacker of the invention.

When the pallet stack is loaded into the conveyor and is positioned so that the runners with the pair of notches as shown on the left side of FIG. 10A are positioned facing toward the photo emitters 30 and photo receptors 32, the positioning of the pallet stack must be more accurately controlled so that the lifting tabs on the pair of lifting arms will be received in the notches in the pallet runners. In the construction of pallets of this type the notches have a set spacing between them and are positioned set distances from the opposite ends of the runners. The spacing between the pair of lifting tabs on each lifting arm corresponds to the spacing between the centers of the notches. Therefore, by determining the position of the rearward end of the second pallet in the stack, the arm lifting tabs can be aligned with the notches. For this determination, a photo sensor 34 at the entry of the dispenser is employed to detect the rearward edge of the second pallet in the stack.

Again, the top photo sensor 28 senses the presence of the stack of pallets on the conveyor. However, now the photo sensor 34 and its associated reflector positioned on opposite sides of the entry of the conveyor are employed to properly position the pallet stack. This photo sensor 34 is employed to precisely locate the rearward edge of the second pallet in the stack. By locating this rearward edge of the second pallet, the lifting tabs on the lifting arms are in position to be inserted into the pair of notches in the runners of the pallet when the arms are moved toward each other. When the stack of pallets is received on the conveyor, if the light of the photo sensor 34 is interrupted, the control system will control the conveyor to move the pallet stack forward until the photo sensor 34 is no longer interrupted. At this instance, the photo sensor 34 tells the control system that the rearward edge of the second pallet in the stack has just moved fowardly of the photo sensor 34 and the second pallet in the stack is properly positioned to receive the lifting arm tabs in the pair of notches in its side runners. However, if the photo sensor 34 at the entry of the dispenser is not interrupted and the photo sensor 28 over the conveyor senses the presence of a pallet stack, the control system will operate to move the pallet stack rearwardly until the photo sensor 34 at the entry of the dispenser is interrupted. Upon interruption of this photo sensor 34, the control system will then operate to reverse the movement of the conveyor moving the pallet stack forwardly in the dispenser until the second pallet in the stack no longer interrupts the photo sensor 34. At this instance, the control system knows that the rearward edge of the second pallet is positioned just forward of the photo sensor 34 and is properly positioned to receive the lifting arm tabs in the pair of notches of the side runners of the second pallet.

In all operations of the pallet unstacker/stacker, it is the position of the second pallet in the stack to be lifted above the bottom most pallet that is critical. The position of the first pallet on the conveyor is unimportant as this pallet will be repositioned by the guide rails. However, the pallet unstacker/stacker must be able to determine the position of the second pallet in the stack in order to lift the stack of pallets from the first pallet so that the first pallet may then be straightened.

Figure 4:
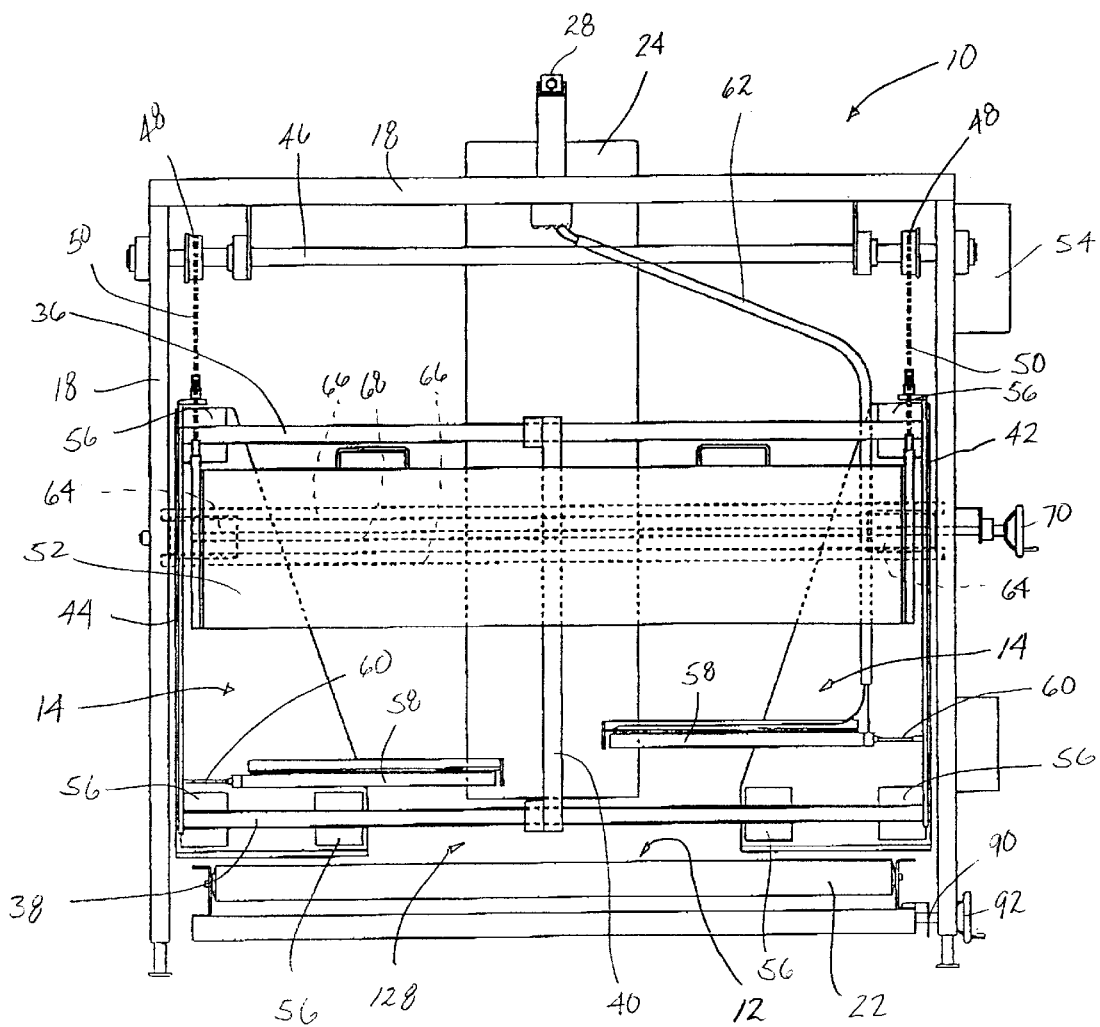
FIG. 4 is a rear view of the pallet unstacker/stacker.

The pair of lifting arms 14 are supported on a rack for the arms positioned at the back of the dispenser frame 18. The rack is comprised of a pair of horizontal, cylindrical rods 36, 38 that are connected together by a brace 40 at their centers and by additional braces 42, 44 at their opposite ends as shown in FIG. 4. The entire rack formed by the rods 36, 38 and the three braces 40, 42, 44 can be raised and lowered by a pair of chain drives that include an axle 46 mounted for rotation at the top of the frame 18, a pair of sprockets 48 secured at opposite ends of the axle 46 and a pair of chains 50 that extend upwardly from the tops of the two side braces 42, 44 around the sprockets 48 and then downwardly to their connections to a large counterweight 52. The counterweight 52 counters the weight of the rack and the pair of lifting arms 14 with their associated connections yet to be explained. An electric motor 54 rotates the axle 46 in opposite directions in response to commands received from the central control system 26. Each of the lifting arms 14 has three bushings 56 that connect the lifting arms to the horizontal rods 36, 38 for sliding movement thereon. The sliding movement of the lifting arms 14 is powered by double-acting piston/cylinder assemblies including the double-acting cylinders 58 that are secured on each lifting arm 14 and their associated pistons 60 that are secured to the side braces 42, 44 of the rack. The opposite sides of the cylinder 58 are selectively provided with pneumatic pressure by a pair of air lines 62, only one of the pairs being shown in FIG. 4 to simplify the drawings. The selective supply of pneumatic pressure to the opposite ends of the cylinders is also controlled by the central control system 26. By supplying air to the sides of the cylinders 58 that cause their pistons 60 to be extended, the lifting arms 14 are moved laterally across the conveyor 12 toward each other. Supplying pneumatic pressure to the opposite side of the cylinders 58 causes their pistons 60 to retract and causes the pair of lifting arms 14 to move laterally over the conveyor 12 away from each other. A pair of stop blocks 64 are mounted on a pair of sliding rods 66 that extend across the back of the frame 18. The stop blocks 64 are also screw threaded on an adjustment turn screw 68 that is turned by a manual handle 70. Turning the handle in one direction adjusts the stop blocks away from each other and turning the handle in the opposite direction adjusts the stop blocks toward each other. The stop blocks 64 engage against the laterally outer surfaces of the lifting arms 14 limiting the extent to which the lifting arms can be separated from each other. In this manner, the stop blocks 64 provide an adjustment of the degree to which the lifting arms 14 can be separated from each other. With both the drive system provided by the sprockets 48 and chains 50 and by the cylinders 58 and their pistons 60 being controlled by the central control system 26, the control system can systematically drive the lifting arms 14 to be raised and lowered vertically and to move toward each other and away from each other laterally.

As best seen in FIGS. 1, 2 and 3, each lifting arm 14 has a lifting ledge 72 with a pair of tabs or fingers 74 projecting inwardly from the ledge 72. A side panel 76 projects upwardly from the lifting ledge 74 and a back panel 78 also projects upwardly from the lifting ledge 72. The side panel 76 and back panel 78 form a corner on each lifting arm 14 that functions to provide some initial straightening of skewed pallets when the lifting arms move together to engage the second pallet. Both cylinders 58 of the lifting arms are supplied by the same source of air pressure. When the arms 14 are moved toward each other, each arm will move until one of the arms engages a side of the second pallet and its further movement is resisted. The other arm continues to move until it also contacts the second pallet. The arms then continue to move together turning the second pallet if it is skewed and turning the stack on the second pallet, and possibly turning the first pallet on the conveyor, until the two lifting arms are pressed firmly against the opposite lateral sides of the pallet with the tabs inserted into the pallet openings. Note that the lifting arms turn the second pallet in the lateral position it is found by the lifting arms. The lifting arms do not slide the second pallet toward the center of the conveyor as they move together. As stated earlier, the lifting tabs or fingers 74 that project laterally inwardly toward each other from the lifting ledge 72 of each lifting arm 14 have a spacing therebetween that is specifically designed to position the tabs 74 where they will extend into the notches in the runners of a pallet of conventional construction such as that shown in FIG. 10A.

Referring to FIG. 3, there are three mechanical switches 80, 82, 84 mounted on the frame in positions where they will engage with a projection (not shown) secured to the rack that supports the pair of lifting arms 14. Engagement of the projection with each of these three switches 80, 82, 84 provides a signal to the central control system 26 indicative of the vertical position of the lifting arms 14 relative to the conveyor 12. When the bottom most switch 84 is tripped by the projection, a signal is sent to the central control system 26 indicating that the lifting arms 14 are in their lowest positions in which they place the stacked pallets supported on the lifting arms onto the conveyor 12. When the middle switch 82 is tripped by the projection, it sends a signal to the central control system 26 indicating that the lifting arms 14 are vertically positioned on the opposite lateral sides of the second pallet in a stack resting on the conveyor 12. When the upper switch 80 is tripped by the projection, it sends a signal to the central control system 26 indicating that the lifting arms 14 have been raised vertically to elevate a pallet or stack of pallets above the pallet resting on the conveyor 12, enabling that pallet to be dispensed by the conveyor.

The pair of guides 16 include a pair of flat metal rails 86 that extend longitudinally across the conveyor 12 traversing the rollers 22 of the conveyor. Each rail 86 has a longitudinal length that is substantially equal to that of the lifting arms 14. The flat profile of the rails 86 over the rollers 22 enables the lifting arms 14 to pass over the rails 86 in the lowest vertical position of the lifting arms 14 without contacting the rails 86.

Figure 5:
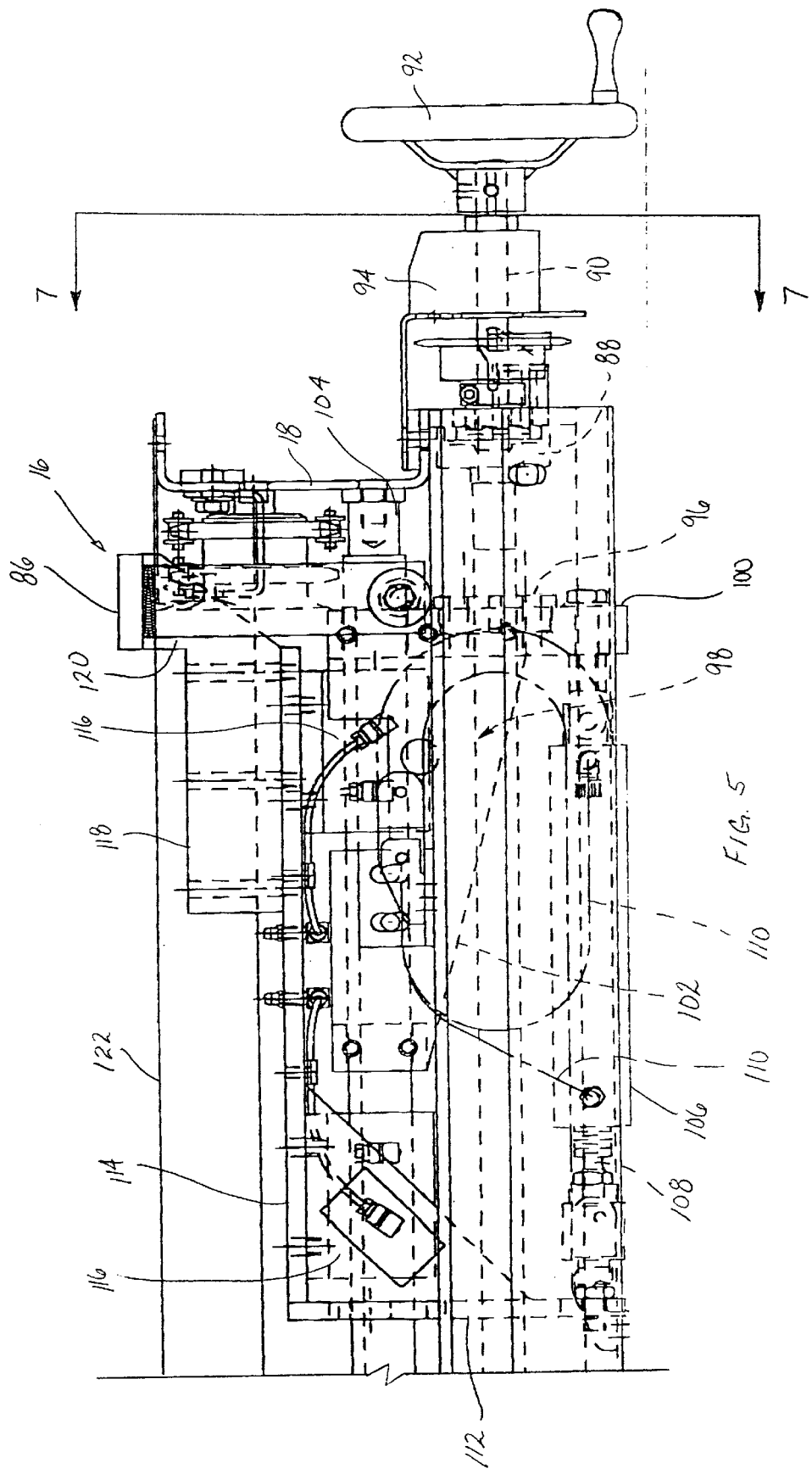
FIGS. 5–7 are partial views of one of the drive systems of the device.
Figure 6:
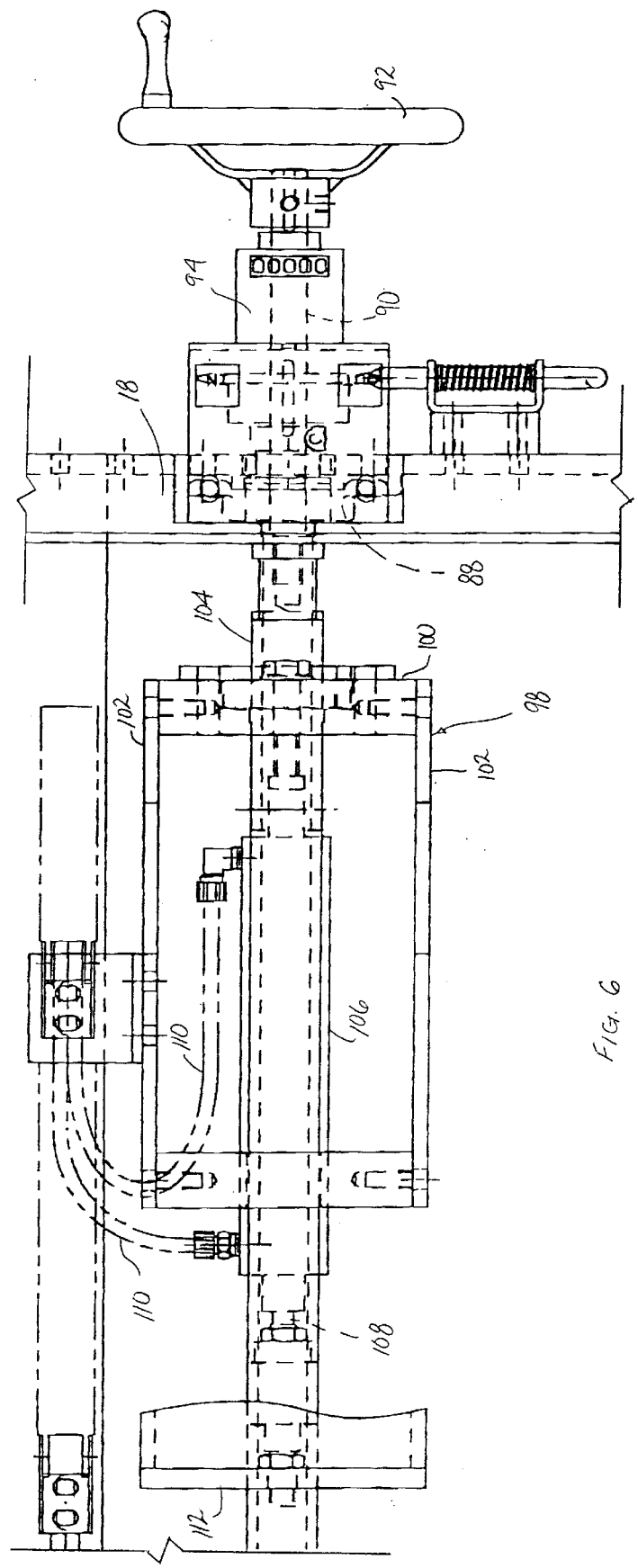
Figure 7:
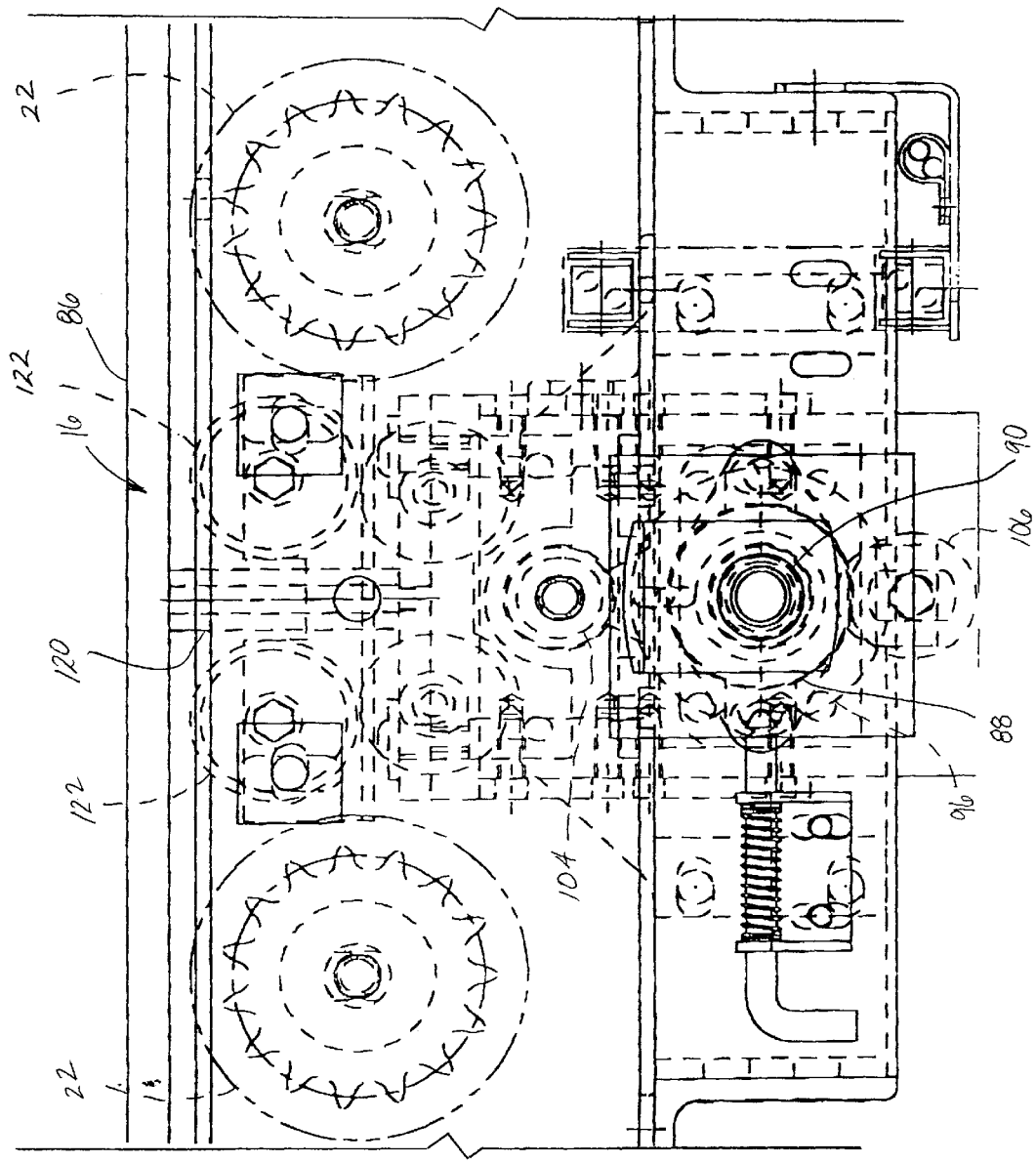

FIGS. 5–7 show the drive system for the left-hand side rail as viewed from the front of the unstacker/stacker. It should be understood that the drive system for the right side rail is identical to that of the left side rail. FIG. 5 is a side view of the drive system for the left side rail 86 from the rear of the drive system, FIG. 6 is a partial top view of the drive system and FIG. 7 is an end view of the drive system. Supported on the frame 18 is a bearing 88. A like bearing is supported on the frame at the laterally opposite side of the device. A threaded shaft 90 extends through the bearing and is also supported by the bearing on the opposite side of the device. The threads at the laterally opposite ends of the shaft are opposite to each other, just as in the threaded shaft of the turn screw 68 that adjustably positions the lifting arms 14 toward and away from each other by rotating the shaft in opposite directions. A handle 92 is provided on the end of the shaft for adjustment rotation. A digital counter 94 is also mounted on the shaft and secured to the frame 18 and provides a visual indication of the degree of adjustment. The shaft 90 also passes through a flange nut 96 screw threaded on the shaft. The flange nut in turn is secured to a bracket 98 comprised of an end wall 100 and a pair of side walls 102. With the flange nut 96 mounted to the end wall 100, turning the handle 92 in opposite directions of rotation will move the bracket 98 laterally back and forth across the conveyor, or left to right as viewed in FIGS. 5 and 6. A sliding shaft 104 is also mounted to the frame 18 and extends laterally across the device and is mounted to the frame at the opposite side of the device. The bracket 98 is mounted for sliding movement on the sliding shaft 104.

A pneumatic cylinder 106 has one end mounted to the bottom of the bracket end wall 100. A piston rod 108 projects from the cylinder 106. Pneumatic pressure lines 110 communicate with the opposite ends of the pneumatic cylinder 106 and selectively supply pneumatic pressure to one side of the cylinder while venting pressure from the opposite side to cause the piston rod 108 to extend from and retract back into the cylinder 106, as is conventional. The piston rod 108 is connected by a misalignment coupling to an L-shaped carriage having an end wall 112 to which the piston is connected and a top wall 114. A pair of bushings 116 are mounted to the underside of the carriage top wall 114 and are mounted for sliding movement on the sliding shaft 104. Selective supply of pneumatic pressure to the cylinder 106 is controlled by the central control system 26. It can be seen that by the selective supply of pneumatic pressure to the cylinder 106 to control the extension and retraction of the piston rod 108 relative to the cylinder, that the L-shaped carriage will reciprocate laterally relative to the cylinder and relative to the laterally adjusted position of the bracket end wall 100 over the threaded shaft 90. A block 118 is mounted on the top of the carriage top wall 114 and a post 120 projects upwardly from the block 118. The rail 86 is mounted on the top of the post 120. As best seen in FIG. 7, the post 120 projects upwardly between a pair of idler rollers 122 that are smaller than the drive rollers 22 and are not connected to the drive system of the drive rollers. In the preferred embodiment, the drive rollers have a 4 inch diameter and the idler rollers have a 2 inch diameter. Employing the smaller idler rollers provides clearance for the guide rail drive system beneath the rollers.

With the drive system of the guide rails 86 described above, manually turning the handle 92 will cause the bracket end wall 100 to move laterally along the threaded shaft 90 and adjustably position the drive system together with the guide rail 86 laterally relative to the conveyor 12. When the drive system is in its adjusted position, selective supply of pneumatic pressure to the cylinder 106 will cause the piston rod 108 to extend from the cylinder moving the guide rail 86 with it to the left as viewed in FIG. 5. Selective supply of pneumatic pressure to the cylinder 106 to cause the piston rod 108 to be retracted back into the cylinder will cause the guide rail 86 to move to the right as viewed in FIG. 5. In this manner, the guide rails can be adjustably positioned relative to each other over the conveyor 12 by turning the manual handle 92. Once the guide rails are in their adjusted position, the selective supply of pneumatic pressure to the drive systems of each of the guide rails 86 will cause the guide rails to move laterally toward each other and laterally away from each other.

Figure 8:
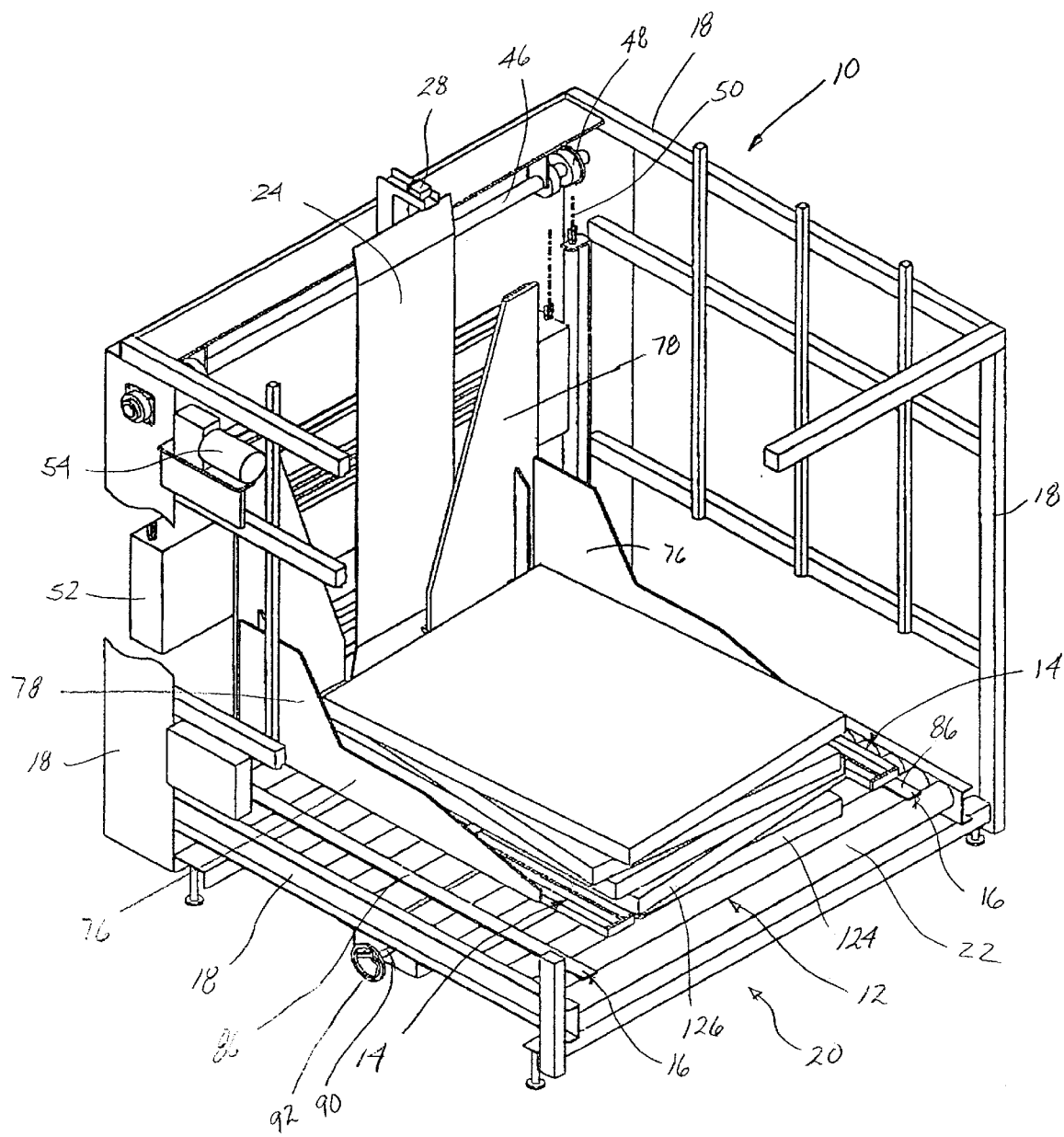
FIG. 8 is a perspective view of the pallet unstacker/stacker with portions of the dispenser frame broken away to provide a better view of the operation of the pallet unstacker/stacker.
Figure 9:
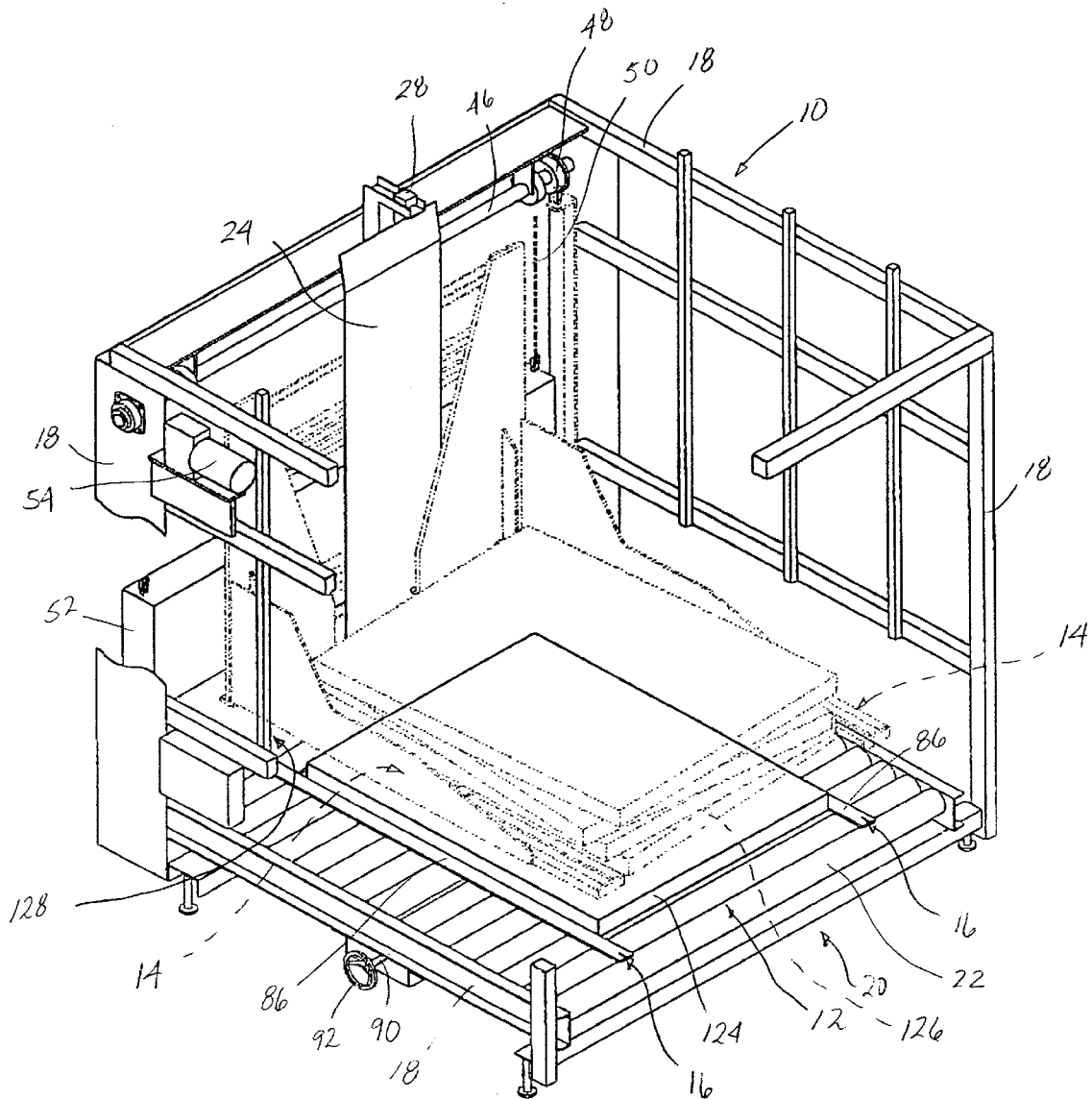
FIG. 9 is a view similar to FIG. 8 illustrating further operation of the pallet unstacker/stacker of the invention.

FIGS. 8 and 9 illustrate the operation of the pallet unstacker/stacker. In FIG. 8, a stack of pallets has been loaded onto the rollers 22 of the conveyor with a first, bottom most pallet 124 supported on the conveyor and a second pallet 126 on top of the first pallet. As can be seen in FIG. 8, each of the pallets in the stack is skewed relative to the other pallets of the stack. The back plate 24 of the frame insures that the stack of pallets are not positioned too far forward in the unstacker/stacker. With the stack of pallets supported on the conveyor, the sensors 28, 30, 32, 34 determine if the stack is properly positioned in the device for operation of the device as explained earlier. With the central control system 26 systematically controlling the drive systems of the conveyor 12, lifting arms 14 and guides 16, the lifting arms 14 are first controlled.

The lifting arms 14 are set at their furthest adjusted lateral spacing from each other when the device is in an at rest condition prior to the loading of the stack of pallets. With the pallets on the conveyor, the drive system for the lifting arms 14 explained earlier lowers the pair of lifting arms 14 so that they are positioned on opposite lateral sides of the second pallet 126 from the bottom of the pallet stack. This position is indicated by actuation of the middle switch 82. When the lifting arms are in this position, they are then driven laterally toward each other causing the lifting ledges 72 to engage the opposite lateral side ledges of the second pallet 126 and causing the lifting tabs 74 to be inserted into the openings at the opposite lateral side ledges of the pallet. Because the lifting arms 14 are moved toward each other by the double acting pneumatic cylinders 58, they will stop moving toward each other when the second pallet 126 is gripped between the lifting ledges 72 as explained earlier.

The lifting arms 14 are then controlled to lift the stack of pallets from the second pallet 126. This raises the stack of pallets above the conveyor 12 except for the first pallet 124 on the conveyor. The lifting arms 14 raise the stack of pallets only a short distance indicated by actuation of the top switch 80, but the distance is sufficient to clear an exit opening 128 at the rear of the dispenser frame 18.

With the lifting arms 14 having raised the stack of pallets, the drive systems for the guide rails 86 are then activated by the control system 26. Pneumatic pressure is provided to the cylinders 106 of the rail drive systems causing the rails 86 to move toward each other across the conveyor 12. The guide rails 86 engage the opposite lateral sides of the first pallet 124 supported by the conveyor. The longitudinal length of each guide rail 86 straightens or squares the first pallet 124 on the conveyor rollers 22 as the rails move laterally toward each other. By straightening or squaring, what is meant is that the opposite lateral side edges of the pallet 124 are generally perpendicular to the rollers 22 and the longitudinally opposite forward and rearward edges of the pallet 124 are generally parallel with the rollers 22. The dimensions of the double acting cylinders 106, their associated piston rods 108 are such that there will be a total of ¾ of an inch of clearance between the opposite lateral sides of the pallet 124 and the guide rails 86 once the guide rails are moved to their furthest extend laterally toward each other. As explained earlier, the extent to which the guide rails 86 may be moved toward each other is adjusted by the hand wheel 92 at the side of the frame 18. Because there is a minimal clearance between the opposite lateral sides of the pallet 124 and the rails 86 once the rails have completed the straightening operation on the pallet, it is not necessary for the rails 86 to be moved laterally outwardly away from the straightened pallet 124 prior to activation of the conveyor 12.

With the pallet 124 straightened, the central control system 26 activates the conveyor 12 to cause the rollers 22 to convey the straightened pallet beneath the elevated rack of the lifting arms 14 and out of the dispenser through the back opening 128 of the frame 18. After the pallet 124 is dispensed from the conveyor as sensed by the sensor 28 positioned above the conveyor, the central control system 26 causes the guides 16 to moved outwardly and the lifting arms 14 to place the stack of remaining pallets back on the conveyor rollers 22 where the sequence of operational steps is repeated to straighten the second pallet 126, now the bottom pallet of the stack, while raising the remaining pallets in the stack.

The pallet dispensing device described provides a novel dispenser that is capable of straightening a stack of pallets where adjacent pallets are significantly skewed relative to each other and dispensing the pallets one at a time after they have been straightened. Because the lifting arms 14 and the guides 16 can be adjustably positioned laterally away from each other by turning of their respective manual adjustment wheels, the dispenser is capable of straightening a stack of significantly skewed pallets that prior art pallet unstacker/stackers are not capable of handling. Furthermore, because each of the component parts and their drive systems and their control systems are all mounted on a unitary, transportable frame, the pallet unstacker/stacker of the invention may be transported in conventional cargo containers and is easily incorporated into existing pallet conveyor systems.

While the present invention has been described by reference to a specific embodiment, it should be understood that modifications and variations of the invention may be constructed without departing from the scope of the invention defined in the following claims.

What is claimed:

1. A pallet unstacker/stacker comprising:
   a conveyor that is adapted to convey a pallet supported on the conveyor out of the pallet unstacker/stacker in a first direction;
   a pair of arms that are adapted to move over the conveyor to engage a second pallet resting on a first pallet that is at a bottom of a stack of pallets when the stack of pallets is supported on the conveyor, and to lift the second pallet off of the first pallet; and,
   a pair of guides that are adapted to move across the conveyor transverse to the first direction to engage the first pallet supported on the conveyor and to orient the first pallet at a desired orientation on the conveyor.

2. The pallet unstacker/stacker of claim 1, wherein:
   the unstacker/stacker has a unitary transportable frame that supports the conveyor, the pair of arms and the pair of guides.

3. The pallet unstacker/stacker of claim 2, wherein:
   the frame has a bottom, laterally opposite sides and a back, the conveyor is supported by the laterally opposite sides of the frame at the bottom of the frame and the front of the frame is open providing clearance for passage of a stack of pallets through the open front and onto the conveyor, and the pair of arms are supported by the back of the frame.

4. The pallet unstacker/stacker of claim 3, wherein:
   the frame is a rigid boxlike structure.

5. The pallet unstacker/stacker of claim 2, wherein:
   the conveyor has a lateral width between laterally opposite sides of the frame and a longitudinal length between a front and back of the frame, the pair of guides are adapted to move laterally toward and away from each other across the conveyor and the pair of arms are adapted to move laterally toward and away from each other over the pair of guides and the conveyor as well as vertically toward and away from the conveyor.

6. The pallet unstacker/stacker of claim 1, wherein:
   the pair of arms is adapted to move over the conveyor independent of the pair of guides.

7. The pallet unstacker/stacker of claim 1, wherein:
   the conveyor is a roller conveyor comprising a plurality of parallel rollers and the pair of guides includes posts that project upwardly between adjacent rollers of the plurality of rollers and are moveable toward and away from each other between the adjacent rollers.

8. The pallet unstacker/stacker of claim 7, wherein:
   the pair of guides further include rails that are supported on the posts and extend transversely over the plurality of rollers.

9. The pallet unstacker/stacker of claim 2, wherein:
   the conveyor has a drive system that is supported on the unitary frame and is systematically controlled to cause the conveyor to move a pallet supported on the conveyor out of the unstacker/stacker;
   the pair of arms has a drive system that is supported on the unitary frame and is systematically controlled to move the arms vertically to position the pair of arms, when a stack of pallets is supported on the conveyor, on opposite sides of a second pallet resting on a first pallet at a bottom of the stack, and to move the pair of arms toward each other to engage the opposite sides of the second pallet, and to move upwardly to lift the second pallet off the first pallet supported on the conveyor;

the pair of guides has a drive system that is supported on the unitary frame and is systematically controlled to move the pair of guides toward each other to engage opposite sides of the first pallet supported on the conveyor and to orient the first pallet at a desired orientation on the conveyor; and a control system is supported on the unitary frame and controls the systematic movement of the conveyor, the pair of arms and the pair of guides.

10. A pallet unstacker/stacker that straightens the orientation of pallets in a stack and dispenses the pallets, one at a time, out of the unstacker/stacker, the pallet unstacker/stacker comprising:

a unitary transportable frame;

a conveyor supported by the unitary frame, the conveyor having a drive system that is operable to cause the conveyor to move a pallet supported on the conveyor out of the pallet unstacker/stacker;

a pair of arms supported by the unitary frame, the pair of arms having a drive system that is operable to move the arms vertically to position the arms, when a stack of pallets is supported on the conveyor, on opposite sides of a second pallet resting on a first pallet at a bottom of the stack, and to move the pair of arms toward each other to engage the opposite sides of the second pallet, and to move upwardly to lift the second pallet off the first pallet supported on the conveyor;

a pair of guides supported by the unitary frame, the pair of guides having a drive system that is operable to move the pair of guides toward each other to engage opposite sides of the first pallet supported on the conveyor to square the pallet on the conveyor; and a control system supported on the unitary frame, the control system controlling the operation of the drive systems of the conveyor, the pair of arms and the pair of guides.

11. The pallet unstacker/stacker of claim 10, wherein:
the control system controls the pair of arms and the pair of guides to move independently of each other.

12. The pallet unstacker/stacker of claim 11, wherein:
the conveyor is a roller conveyor comprising a plurality of parallel rollers and the pair of guides includes posts that project upwardly between adjacent rollers of the plurality of rollers and are moveable toward and away from each other between the adjacent rollers.

13. The pallet unstacker/stacker of claim 12, wherein:
the pair of guides further include rails that are supported on the posts and extend transversely over the plurality of rollers.

14. A pallet unstacker/stacker that squares pallets that are placed in a stack in the pallet unstacker/stacker and dispenses pallets, one at a time, from the stack out of the unstacker/stacker, the unstacker/stacker comprising:

a conveyor having a lateral width and a longitudinal length that will accommodate a stack of pallets in which one or more pallets are misaligned, the conveyor having a drive system that is systematically controlled to move a pallet supported on the conveyor out of the pallet unstacker/stacker;

a pair of cantilevered arms that project longitudinally over the conveyor, the pair of arms having a drive system that is systematically controlled to move the arms vertically to position the pair of arms on laterally opposite sides of a second pallet resting on a first pallet at a bottom of a stack of pallets when the stack of pallets is supported on the conveyor, and to move the pair of arms laterally toward each other to engage the opposite lateral sides of the second pallet, and to move upwardly to lift the second pallet off the first pallet supported on the conveyor;

a pair of guides that extend over the conveyor, the pair of guides having a drive system that is systematically controlled to move the guides laterally toward each other to engage opposite lateral sides of the first pallet supported on the conveyor and to square the first pallet laterally and longitudinally relative to the conveyor; and a control system on the dispenser that controls the systematic movement of the conveyor, the pair of arms and the pair of guides.

15. The pallet unstacker/stacker of claim 14, wherein:
the control system includes a plurality of sensors positioned toward longitudinally opposite ends of the conveyor that sense longitudinal positioning of a stack of pallets support on the conveyor.

16. The pallet unstacker/stacker of claim 15, wherein:
the control system includes means for systematically controlling the conveyor drive system to adjustably position a pallet supported on the conveyor longitudinally relative to the plurality of sensors at the longitudinally opposite ends of the conveyor.

17. The pallet unstacker/stacker of claim 14, wherein:
the pair of arms are supported on the unstacker/stacker above the pair of guides to move laterally over the pair of guides.

18. The pallet unstacker/stacker of claim 14, wherein:
the pair of guides are supported on the unstacker/stacker above the conveyor and below the pair of arms to move laterally across the conveyor and beneath the pair of arms.

19. The pallet unstacker/stacker of claim 14, wherein:
the conveyor is a roller conveyor comprised of a plurality of rollers that extend laterally across the unstacker/stacker, the guides include a pair of parallel rails that traverse the rollers and are supported by posts that extend downwardly from the pair of rails between adjacent rollers of the plurality of rollers, and the guides drive system is systematically controlled to move the posts toward and away from each other and thereby move the guide rails toward and away from each other.

20. The pallet unstacker/stacker of claim 14, wherein:
the unstacker/stacker includes a frame having laterally opposite sides, longitudinally opposite front and back and a bottom, a front of the frame is open enabling a stack of misaligned pallets to pass through the front of the frame and be placed on the conveyor, the conveyor is supported at the bottom of the frame and the cantilevered arms are support at the back of the frame.

21. The pallet unstacker/stacker of claim 20, wherein:
the guides are supported at the bottom of the frame.

* * * * *